(12) United States Patent
Takahashi

(10) Patent No.: US 7,609,418 B2
(45) Date of Patent: Oct. 27, 2009

(54) CONTACT AREA-SENSOR

(75) Inventor: Masayuki Takahashi, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 621 days.

(21) Appl. No.: 10/668,378

(22) Filed: Sep. 24, 2003

(65) Prior Publication Data

US 2004/0090529 A1    May 13, 2004

(30) Foreign Application Priority Data

Sep. 26, 2002 (JP) ............................ 2002-280491
Aug. 21, 2003 (JP) ............................ 2003-208252

(51) Int. Cl.
*H04N 1/00* (2006.01)
*H04N 1/04* (2006.01)

(52) U.S. Cl. ........................ 358/408; 358/474
(58) Field of Classification Search ................ 358/408, 358/505, 500, 400, 401, 474

See application file for complete search history.

(56) References Cited

U.S. PATENT DOCUMENTS

| | | | | |
|---|---|---|---|---|
| 3,717,411 A * | 2/1973 | Niesen et al. | ................ | 355/75 |
| 4,125,324 A * | 11/1978 | Spence-Bate | ................ | 355/23 |
| 4,150,896 A * | 4/1979 | Wakeman | ................ | 355/75 |
| 5,085,973 A * | 2/1992 | Shimizu et al. | .......... | 430/271.1 |
| 5,875,269 A | 2/1999 | Yamashita et al. | | |
| 5,966,457 A * | 10/1999 | Lemelson | ................ | 382/141 |
| 5,987,991 A * | 11/1999 | Trantow et al. | ............... | 73/624 |
| 6,188,486 B1 * | 2/2001 | Yamada | ................ | 358/1.15 |
| 6,268,997 B1 * | 7/2001 | Hong | ................ | 361/681 |
| 6,400,484 B1 * | 6/2002 | Wang et al. | ................. | 359/196 |
| 6,791,720 B1 * | 9/2004 | Hsieh | ................ | 358/473 |
| 6,856,423 B2 * | 2/2005 | Anderson et al. | .......... | 358/1.18 |
| 7,136,199 B2 * | 11/2006 | Cantwell | ................ | 358/474 |

FOREIGN PATENT DOCUMENTS

| | | |
|---|---|---|
| CN | 1154034 A | 7/1997 |
| JP | 6--253097 | 9/1994 |
| JP | 11-136444 | 5/1999 |

\* cited by examiner

*Primary Examiner*—Douglas Q Tran
(74) *Attorney, Agent, or Firm*—Nixon & Vanderhye, PC

(57) ABSTRACT

A contact area-sensor includes a plurality of image scanners, each of which includes an image scanning sensor substrate in which a plurality of sensor sections are aligned in a matrix manner so as to scan an image; and a connecting line having flexibility, for connecting the plurality of image scanners to each other. On this account, it is possible to provide a small, thin, light-weighted contact area-sensor, which is capable of obtaining a wide area of an image, while ensuring superior portability.

19 Claims, 13 Drawing Sheets

TIMING CHART

CONTACT AREA-SENSOR

This application claims priority to Japanese Application No. 2002-280491 filed Sep. 26, 2002 and Japanese Application No. 2003-208252 filed Aug. 21, 2003, the entire contents of each of which are hereby incorporated by reference.

FIELD OF THE TECHNOLOGY

The present technology relates to a contact area-sensor having an image sensor function, and in particular to a contact area-sensor constituted of a plurality of thin film transistors (TFT) aligned in a matrix manner.

BACKGROUND OF THE TECHNOLOGY

One conventional example of means for obtaining image information from both sides of a document sheet can be found in Japanese Laid-Open Patent Application Tokukaihei 11-136444/1999 (published on May 21, 1999), which discloses a method for simultaneously obtaining image information from both sides of a document sheet by oppositely placing two line sensors on both sides of the document sheet.

However, the image scanning device for simultaneously obtaining information from both sides of the document, such as the one disclosed in the publication above, is disadvantageous in such a regard that, when irradiation light is simultaneously emitted with respect to the same position of the front and rear surfaces of the document, a line sensor placed on one side of the document scans the image information (such as characters) of both the front and rear surfaces of the document. As a result, the device fails to respectively scan the image information from the front and rear surfaces of the document.

One example aimed at solving this problem can be the scanner device disclosed in Japanese Laid-Open Patent Application Tokukaihei 6-253097/1994 (published on Sep. 9, 1994).

The scanner device disclosed in this publication has such an arrangement that two CCD image sensors are oppositely placed fixedly on both sides of a document sheet, while simultaneously emitting two light beams having different wavelengths respectively to the front and rear surfaces of the carried document. This arrangement prevents each of the two CCD sensors from scanning image information from both sides of the document, and allows each CCD sensor to desirably obtain the target image information from each side of the document.

However, since the image scanning device of the first publication scans the document by line sensors, the device requires a mechanism for moving two line sensors, so as to allow them to scan both sides of the document at the same time. This offers a hindrance to realize miniaturization and reductions in thickness and weight of the device. Further, since the device performs simultaneous scanning, it is necessary to block the transmitted light. Furthermore, scanning by line sensors is time consuming.

Meanwhile, as to the second publication, the scanner device is made of a CCD image sensor, which needs focusing, and therefore the device requires an optical system such as a lens, a light path or the like. This offers a hindrance to realize miniaturization and reductions in thickness and weight of the device, and also arises a problem of displacement of the optical system caused by vibration.

Further, both of the foregoing two image scanning devices are only capable of scanning of a document in the form of a sheet, and therefore incapable of two-sided scanning for a thick book etc.

SUMMARY OF THE TECHNOLOGY

An object of the present technology is to provide a small, thin, light-weighted contact area-sensor, which is capable of obtaining a wide area of an image, while ensuring superior portability.

In order to solve the foregoing problems, the contact area-sensor includes: a plurality of image scanners, each of which includes an image scanning sensor substrate in which a plurality of sensor sections are aligned in a matrix manner so as to scan an image; and a connecting line having flexibility, for connecting the plurality of image scanners to each other.

The image scanning sensor substrate scans an image with a plurality of sensor sections aligned in a matrix manner. More specifically, the image scanning sensor substrate is made of a translucent substrate, such as a glass, quartz or the like, on which thin film transistors (TFT) are aligned in a matrix manner, so as to constitute the contact area-sensor. The image scanning sensor substrate generally includes a backlight so as to constitute an image scanner. However, the image scanner may be constituted only of the image scanning sensor substrate.

In the image scanning operation, light emitted toward the rear side of the image scanning sensor substrate passes through inside of the sensor, and then is reflected on the document surface, so as to provide image information to the sensor section. Therefore, the contact area-sensor can obtain image information without using an optical system, which is required in a conventional CCD image sensor, thus realizing a small, thin, and light-weighted contact area-sensor. Further, provision of the sensor sections aligned in a matrix manner allows the contact area-sensor to carries out two-dimensional scanning of an image; therefore, a scanning mechanism is not required, and the scanning speed can be increased.

Further, the contact area-sensor includes a plurality of image scanners, each of which includes an image scanning sensor substrate; and these image scanners are connected to each other by a flexible connecting line.

Accordingly, the contact area-sensor according to the present embodiment includes the separated image scanners, which are however connected to each other by a flexible connecting line. This allows the contact area-sensor to scan a document having a large area with one operation, by bringing the respective image scanners into contact with the target document.

Further, when image scanning is not performed, the respective image scanners can easily be overlaid with each other via the flexible connecting line.

Further, the flexible connecting line allows the image scanners to freely change the composition, so that the contact area-sensor is capable of two sided scanning for a thick book or the like.

Accordingly, it is possible to provide a small, thin, light-weighted contact area-sensor, which is capable of obtaining a wide area of an image, while ensuring superior portability.

Additional objects, features, and strengths will be made clear by the description below. Further, the advantages will be evident from the following explanation in reference to the drawings.

DESCRIPTION OF THE EMBODIMENTS

First Embodiment

The following will explain one embodiment with reference to FIGS. 1 through 17.

Figure 1:
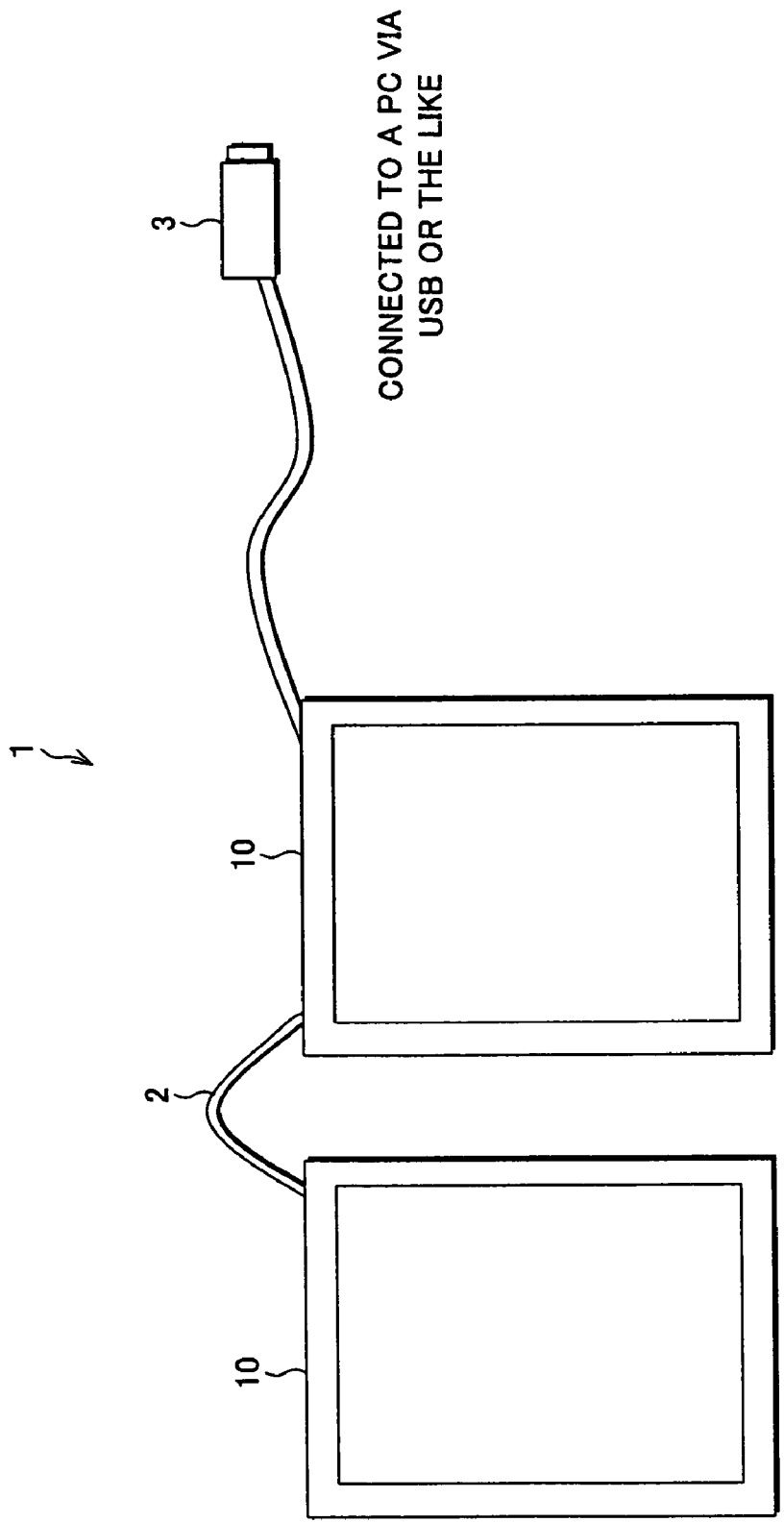
FIG. 1 is a plan view showing one embodiment of a contact area-sensor.

As shown in FIG. 1, a contact area-sensor is constituted of two image scanners 10 which are connected by a connecting line 2. The connecting line 2 has flexibility as made of a flexible cable. Note that, though the present embodiment will explain based on the contact area-sensor constituted of the two image scanners 10, the number of the image scanners is not limited. Accordingly, the contact area-sensor 1 may be constituted of three or more image scanners 10. In such a case, all of the image scanners should be connected to each other by a connecting line 2.

One of the two image scanners 10 is provided with a universal serial bus (USB) 3 so as to be connected to a personal computer (not shown). Accordingly, in the present embodiment, the contact area-sensor 1 is connected to a personal computer at all times.

Figure 2:
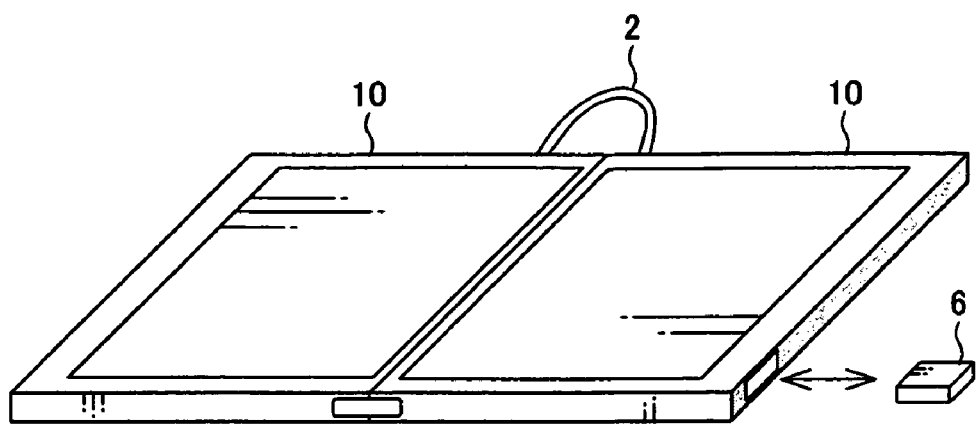
FIG. 2 is a perspective view showing a contact area-sensor including a removable memory chip.

However, the present technology is not limited to this configuration. FIG. 2 shows one possible alternative configuration of the contact area-sensor 1, which includes a memory chip 6 as removable storing means for storing image information after scanning. After storing image information, the memory chip 6 is removed from the contact area-sensor 1 so that the image information stored therein is read out by a personal computer.

Figure 3:
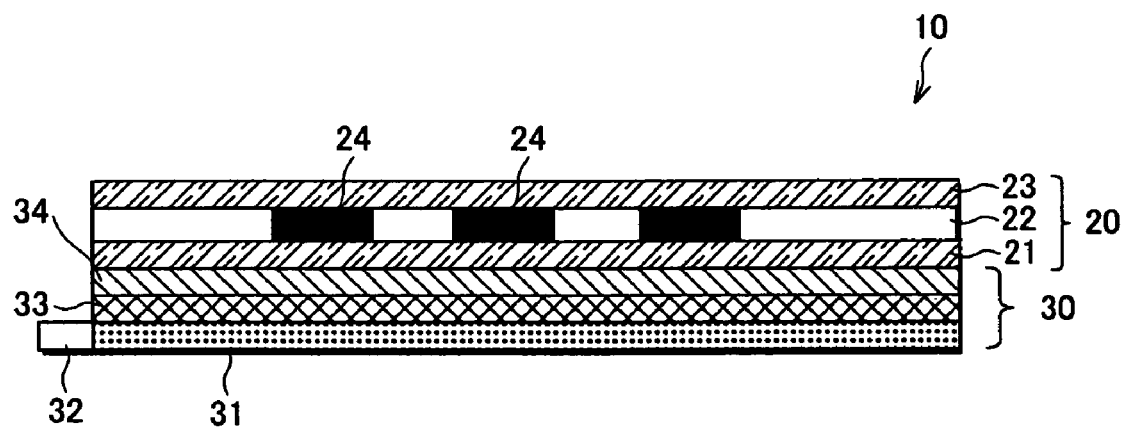
FIG. 3 is a cross-sectional view showing a configuration of an image scanner of the contact area-sensor.

As shown in FIG. 3, the image scanner 10 is constituted of an image scanning sensor substrate 20 as the upper layer, and a backlight as lighting means, which is provided under the image scanning sensor substrate 20.

Figure 4:
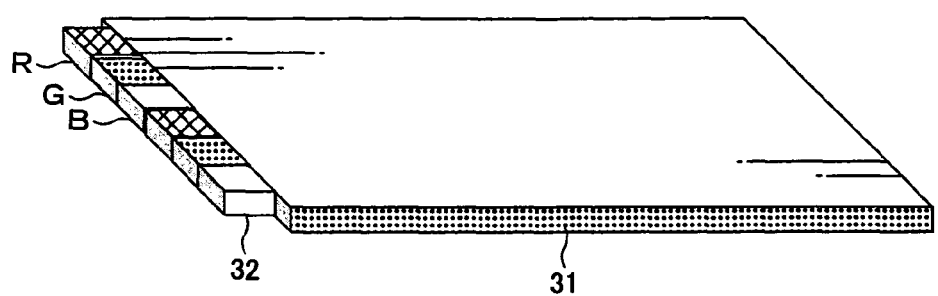
FIG. 4 is a perspective view showing a configuration of a light-emitting diode of a backlight included in the image scanner.

The backlight 30 is made up of three layers. The lowermost layer is an optical waveguide 31, which includes a light emitting diode (LED) 32 of a red (R), green (G) and blue (B) on one end, as shown in FIG. 4. Further, a light scattering body 33 and a condensing lens sheet 34 are laminated on the optical waveguide 31, as shown in FIG. 3.

The image scanning sensor substrate 20 is constituted of, as shown in FIG. 3, a glass substrate 21, a sensor layer 22, and a transparent protection layer 23 provided on the sensor layer 22. The sensor layer 22 includes a pixel array in which a plurality of sensor sections 24 are aligned in a matrix manner.

More specifically, the sensor sections 24 of each pixel includes a photo-sensing TFT (Thin Film Transistor; not shown) as a phototransistor, and a switching TFT (not shown) as a switching element. Further, the light-sensing TFT of each pixel changes its electric property depending on the lightness/darkness of the object of scanning (such as a document).

More specifically, the resistance value of the phototransistor, which is used as a photo-sensing TFT, varies depending on the light intensity; and this variation further causes variation of a charge amount or a voltage stored in a pixel capacitor (storage capacitor) connected to the phototransistor. Then, the switching TFT sequentially reads out the charge amount distribution or the voltage distribution so as to obtain two-dimensional information of the object of scanning.

The following will specifically explain image scanning operation of the foregoing image scanner 10.

Figure 5:
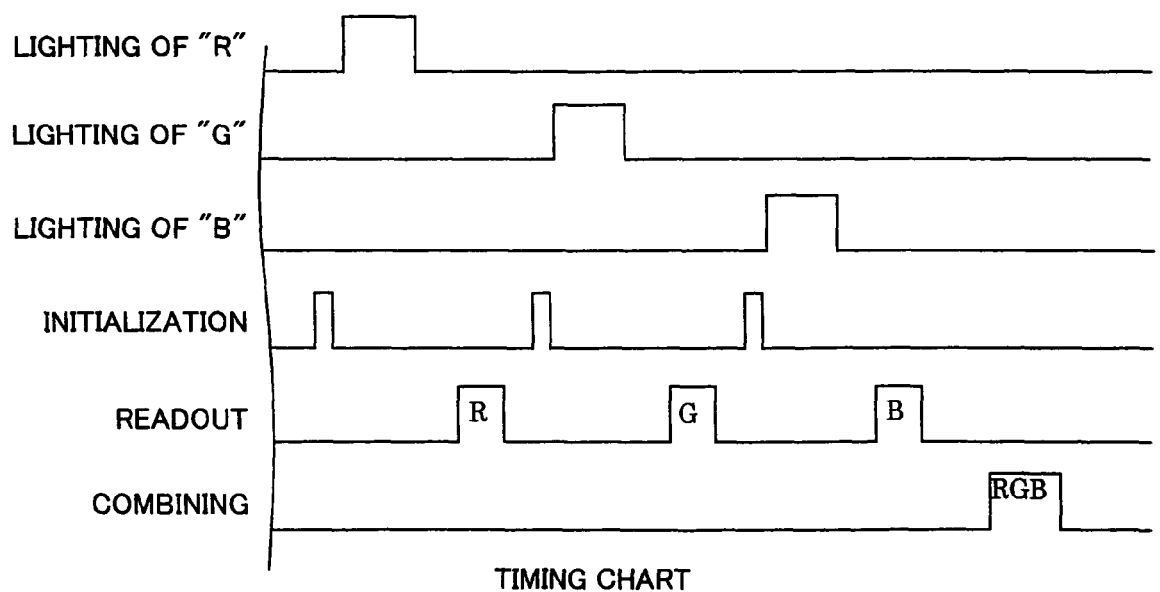
FIG. 5 is a timing chart showing lighting operation of three color light-emitting diode of the backlight.

Firstly, light emitted from the backlight 30 passes through the glass substrate 21 of the image scanning sensor substrate 20 and reaches to a document (not shown), which is oppositely in contact with the protection layer 23. To be more specific, the light from the backlight 30 is created by sequentially lighting the three color (R, G and B) photodiode 32, as shown in FIG. 5. Then, due to the different reflectivities of the image information of the document, the intensity of the light incident to the sensor section 24 is stored as a charge, as described above; and the stored charge is converted into a voltage by using a charge amplifier or the like, and further converted into a digital signal by an analog-digital converter. As a result, three images of red (R), green (G), and blue (B) are created. These three pieces of image information are captured in other memory (not shown) or a periphery circuit, such as a DSP (Digital Signal Processor).

Next, these three images are sequentially transmitted to an external personal computer (not shown) via the universal serial bus 3 so as to be combined together. Here, the respective 8 bits of R, G and B are combined to be a 24 bits signal in each pixel of the image. In practice, a 32 bits signal is created by adding empty 8 bits. As a result, a color image is displayed in the personal computer. This image can also be printed through a printing device.

In this manner, it is possible to provide a small, thin, light-weighted contact area-sensor capable of obtaining image information, without using an optical system which is required for a conventional CCD image sensor. Further, since this area-sensor carries out two-dimensional scanning of an image by using the sensor sections (image scanning section) disposed in a matrix manner, a scanning mechanism is not required, and the scanning speed can be increased.

Incidentally, as shown in FIG. 1, the contact area-sensor 1 of the present embodiment is constituted of two image scanners 10, which are connected through a flexible connecting line 2. Namely, since the contact area-sensor uses a flexible connecting line for connecting the separated image scanners 10 to each other, the image scanners 10 can be brought into contact with a document image, thus allowing scanning of a wide area of an image at once.

Further, when image scanning is not performed, the image scanners 10 can easily be overlaid via the flexible connecting line 2.

Further, the flexible connecting line 2 allows the image scanners 10 to freely change the composition; thus, the image scanners 10 are capable of two sided scanning for a thick book or the like. Accordingly, the contact area-sensor 1 is small, thin, light-weighted, and capable of obtaining a wide area of an image, while ensuring superior portability.

Incidentally, in the foregoing example, the image scanners 10 connected through the connecting line 2 are not fixedly overlaid to each other, and therefore can be inconvenient when carried.

Figure 6:
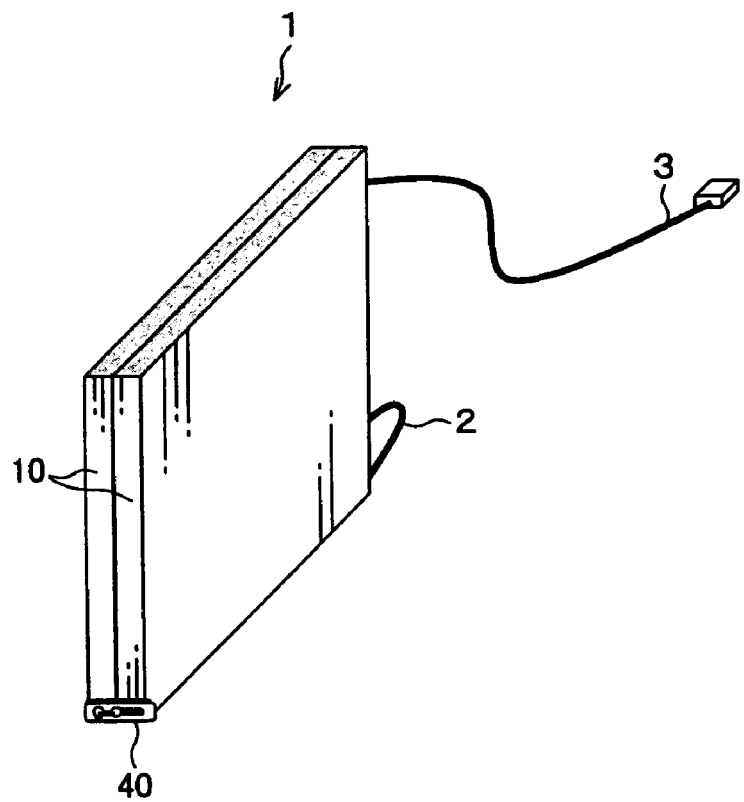
FIG. 6 is a perspective view showing a state where two image scanners are overlaid with each other.
Figure 7:
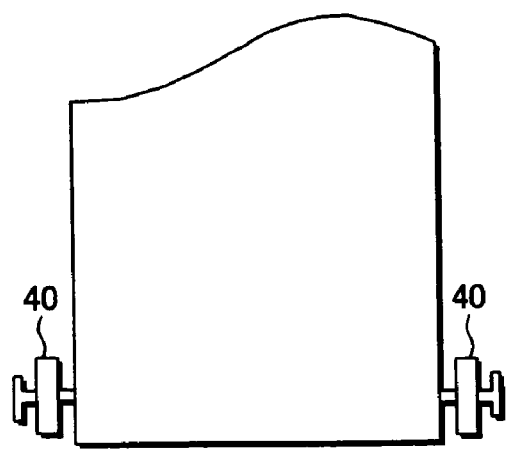
FIG. 7 is a plan view showing the image scanner.

In view of this problem, the contact area-sensor 1 of the present embodiment is arranged so that the respective image scanners 10 are rotatably connected to each other through a hinge member 40, as shown in FIG. 6. Further, the hinge member 40 is provided on each end of the respective lateral faces of the image scanners 10, as shown in FIG. 7.

Figure 8:
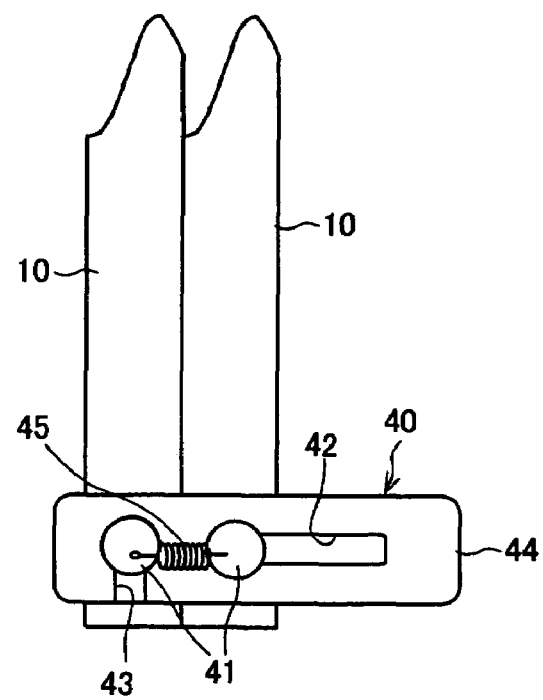
FIG. 8 is a lateral view showing a configuration of a hinge member provided on a lateral face of the image scanner.
Figure 9:
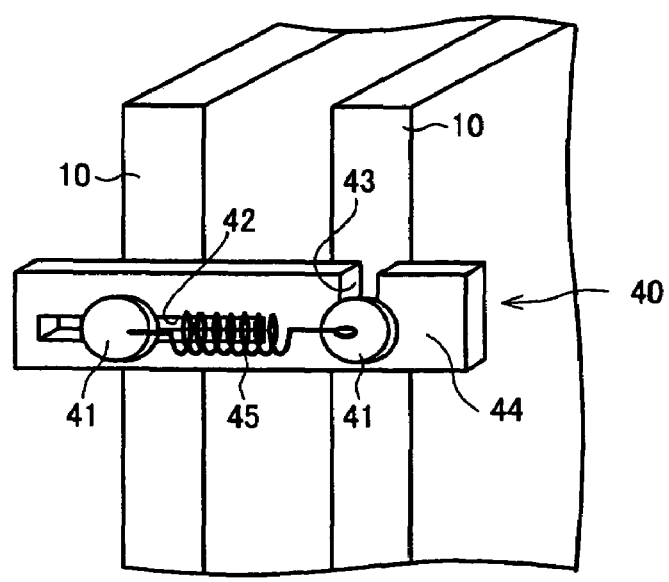
FIG. 9 is a perspective view showing a configuration of the hinge member.

More specifically, as shown in FIGS. 8 and 9, the hinge member 40 is made up of protrusion axes 41, each of which is protruded from one end of a lateral face of one of the image scanners 10; a rectangle plate 44 hung on the protrusion axes 41, including a long hole 42 created in a linear shape in a hanging direction for allowing the protrusion axes 41 to pass through, and a notch 43 created perpendicular to the hanging direction; and a spring 45 made of an elastic body, which pulls one of the protrusion axis 41 toward the other protrusion axis 41.

The protrusion sections 41 are loosely caught by the long hole 42 and the notch 43, in a portion passing through the long hole 42 and the notch 43. The front ends of the protrusion axes 41 are formed as a disk with a larger diameter than that of the long hole 42 and the notch 43 so that the front ends in the form of a disk prevents the rectangle plate 44 from coming out of the protrusion axes 41. Further, The protrusion axis 41 loosely caught by the notch 43 can be easily removed by rotating the rectangle plate 44 along the notch 43. Otherwise, the protrusion axis 41 loosely caught by the notch 43 is not easily come off the rectangle plate 44, as being pulled toward the other protrude axis 41 by the spring 45.

Figure 10:
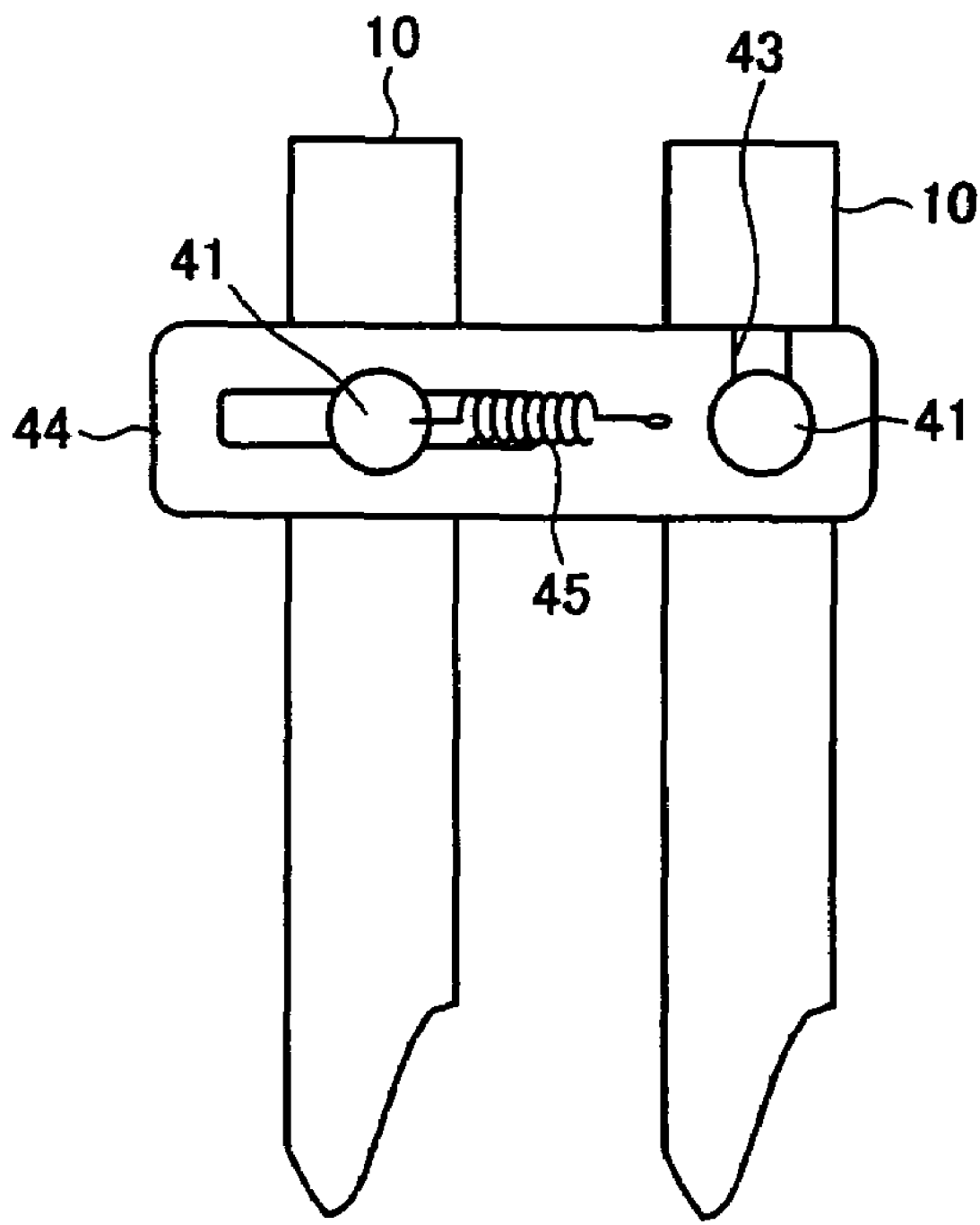
FIG. 10 is a lateral view showing an alternative of arrangement of a spring of the hinge member.
Figure 11:
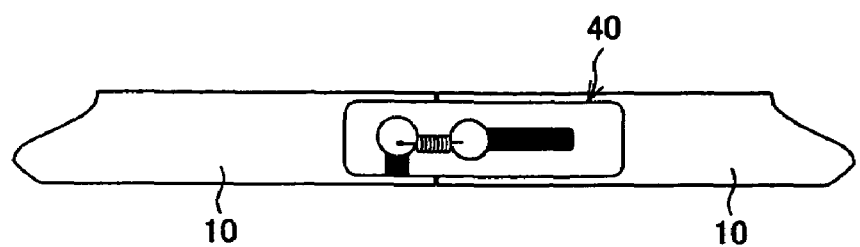
FIG. 11(a) is a lateral view showing a part of the contact area-sensor in which the respective image scanners are fixed at an opened angle of 180° via the hinge member.
FIG. 11(b) is a perspective view showing document scanning by the contact area-sensor and fixed at an opened angle of 180° via the hinge member.
Figure 11:
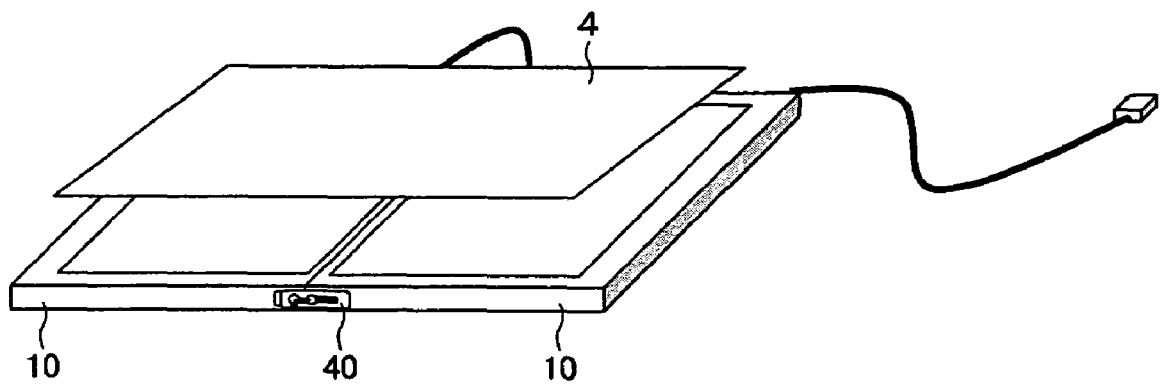
Figure 12:
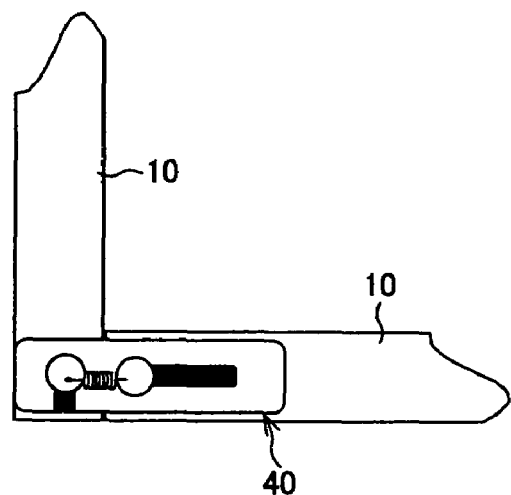
FIG. 12(a) is a lateral view showing a part of the contact area-sensor in which the respective image scanners are fixed at an opened angle of 90° via the hinge member.
FIG. 12(b) is a perspective view showing document scanning by the contact area-sensor and fixed at an opened angle of 90° via the hinge member.
Figure 12:
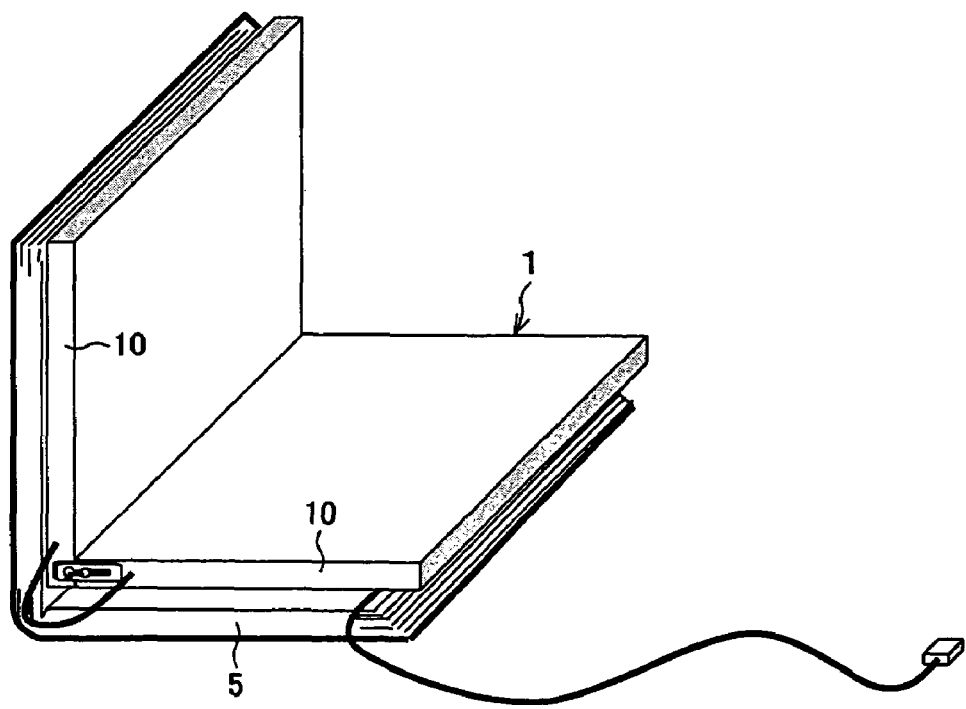

Note that, the spring 45 may instead be other elastic body, such as a rubber. Further, the spring 45 above is mounted to the protrusion axes 41 by their respective ends; however, the present technology also allows such an arrangement that only one end of the spring 45 is mounted to one of the protrusion axis 41, while other is mounted to the vicinity of the notch 43 of the rectangle plate 44, as shown in FIG. 10. This configuration also enables the two image scanners 10 to be pulled toward each other.

By having the hinge member 40, the image scanners 10 are rotatably connected to each other. Further, the respective lateral faces of the image scanners 10 of the present embodiment are formed in a rectangle.

With this arrangement, as shown in FIG. 11(a), by rotating the image scanners 10 about the respective protrusion axes 41, it is possible to open the image scanners 10 through the hinge member 40, and fix them at an angle of 180°. Further, when the respective image scanners 10 are thus fixed at an opened angle of 180° while being in contact with each other by their ends, the image scanners 10 are pulled toward each other by the spring 45, thus stably fixing themselves at the opened angle of 180°.

Consequently, since the hinge member 40 fixes the respective image scanners 10 to be opened at 180°, as shown in FIG. 11(b), the image scanners 10 are stably fixed as a unified plane, and easily scan a document 4 in the form of a sheet.

Further, in the case where the target document has a wider area than that of a single image scanner 10, the scanning can easily be carried out by thus arranging the two image scanners 10 to be a unified plane and fixing them.

Incidentally, when scanning is carried out with respect to both sides of an opened thick book, for example; it is difficult to completely flatten the book, since inner ends of the book are curved toward the binding areas. In this case, if the book is opened at an angle of 90°, the respective pages can be flattened.

More specifically, when scanning of image information is performed with respect to a thick book which is opened at 180°, the book cannot be completely flat, since the respective pages are pulled toward the binding areas, which perpendicularly bend with respect to the pages. Accordingly, the binding areas are missed from the scanned image, or will be deformed even when successfully captured.

In this view, in the present embodiment, the image scanners 10 can be rotated so that they are fixed in the opening state at 90°, as shown in FIG. 12(a).

With this arrangement, as shown in FIG. 12(b), the contact area-sensor 1 can easily and successfully carry out image scanning even for a thick book 5 in such a manner that the book 5 is opened and fixed at 90° so that the respective pages are completely flattened, and the contact area-sensor 1 is brought into fully contact with the whole plane of the target image. Namely, the contact area-sensor 1 is capable of image scanning with respect to a book opened at 90°, and therefore it is not necessary to open the book at 180°.

As shown in FIG. 6 above, in the present embodiment, the image scanners 10 can be fixedly overlaid to each other by the spring 45 having elasticity. Since the spring 45 thus fixes the contact area-sensor 1 in a folded state, the contact area-sensor 1 can be carried in a compact state, thus improving portability.

Figure 13:
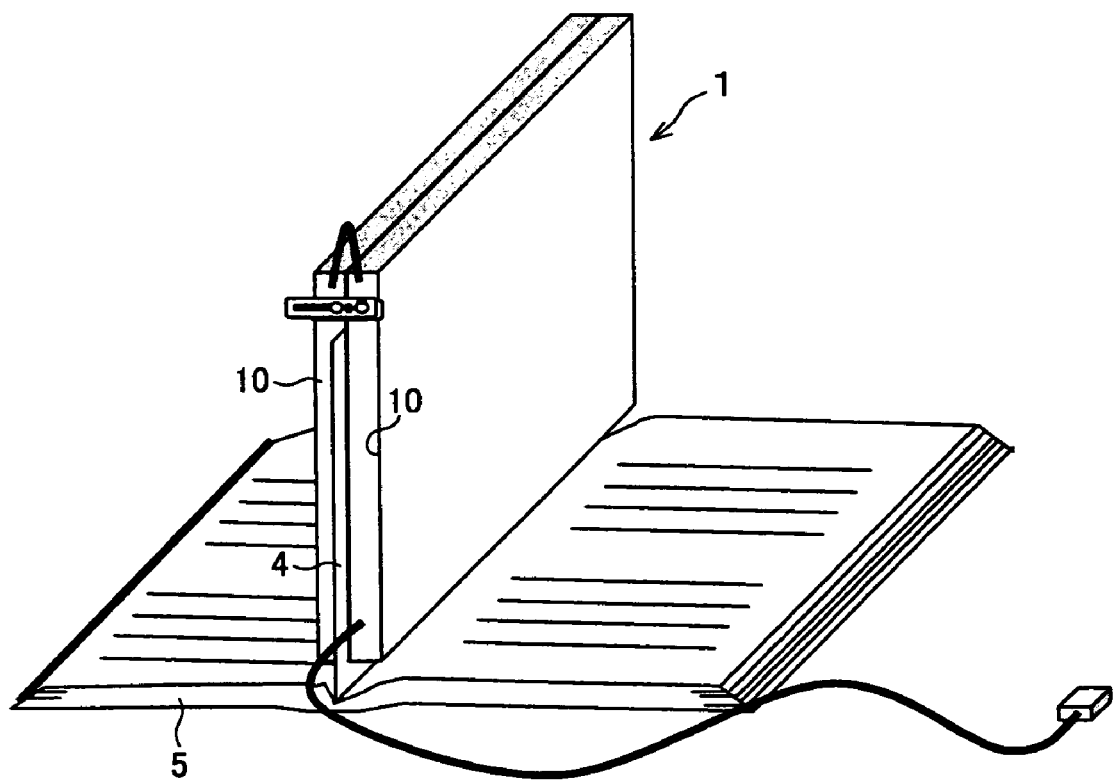
FIG. 13 is a perspective view showing the contact area-sensor in a state of performing two-sided scanning with respect to a book, by holding the document paper by the respective image scanners connected through the hinge member.
Figure 14:
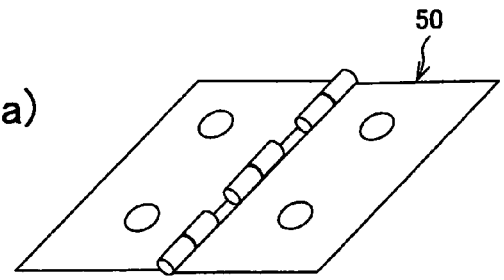
FIG. 14(a) is a perspective view showing another type of hinge member.
FIG. 14(b) is a perspective view showing a closed state of a contact area-sensor which includes the hinge member shown in FIG. 14(a).
FIG. 14(c) is a perspective view showing a half-opened state of a contact area-sensor which includes the hinge member shown in FIG. 14(a).
FIG. 14(d) is a perspective view showing another kind of hinge member which can be divided into two parts.
Figure 14:
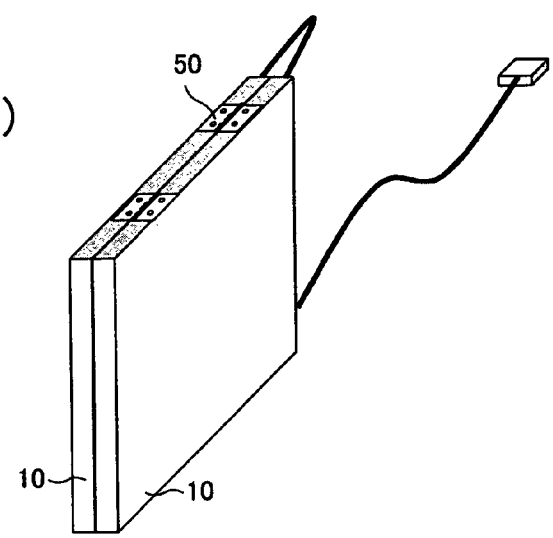
Figure 14:
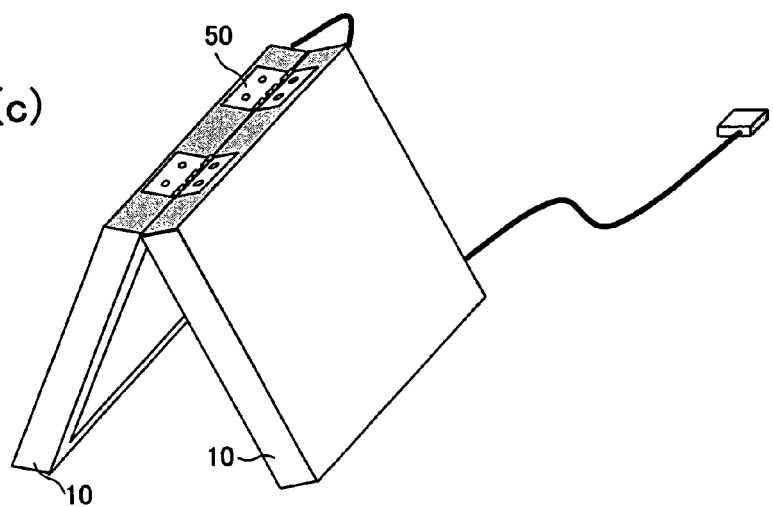
Figure 14:
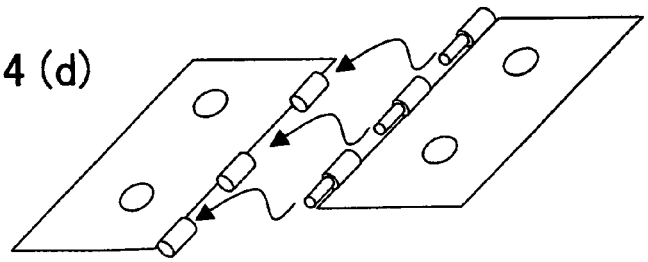
Figure 15:
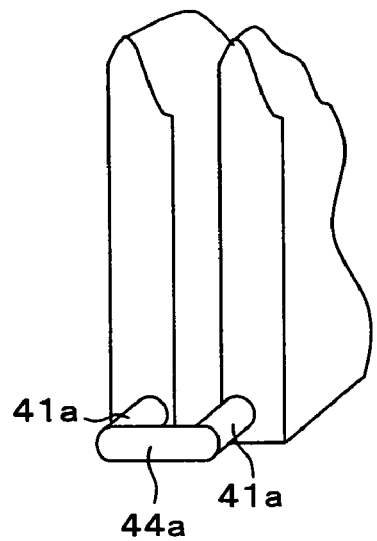
FIG. 15(a) is a perspective view showing still another kind of hinge member.
FIG. 15(b) is a projection view showing an internal configuration of the hinge member shown in FIG. 15(a).
FIG. 15(c) is a detailed cross-sectional view of the hinge member shown in FIG. 15(a).
Figure 15:
Figure 15:
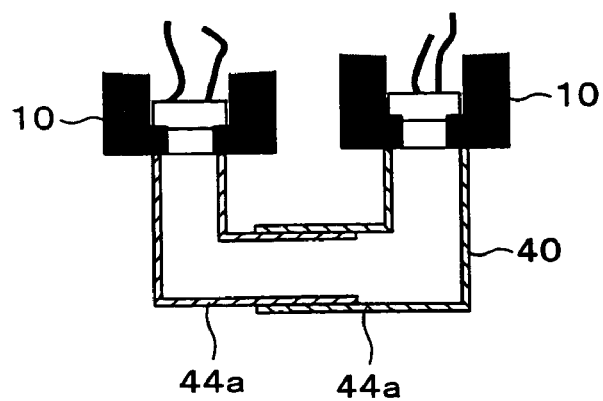
Figure 16:
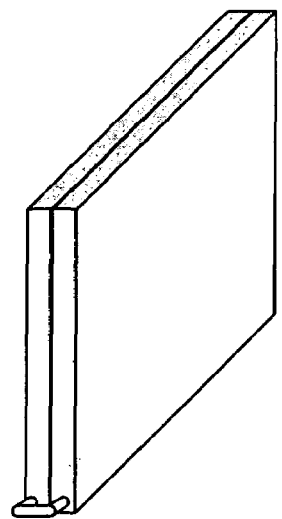
FIG. 16(a) is a perspective view showing a closed state of a contact area-sensor which includes the hinge member shown in FIG. 15(a).
FIG. 16(b) is a perspective view showing an opened state of a contact area-sensor which includes the hinge member shown in FIG. 15(a).
Figure 16:
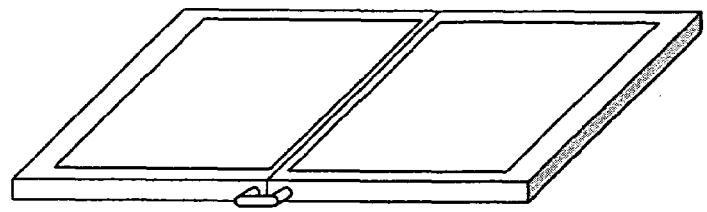

Further, in the present embodiment, the contact area-sensor 1 is folded not only for carriage but also for scanning of both sides of a paper of the book 5, by holding the paper therebetween, as shown in FIG. 13.

For such a case, the contact area-sensor 1 of the present embodiment does not allow both of the image scanners 10 to carry out image scanning at the same time. With this arrangement, each of the image scanners 10 will not scan image information of the rear side of the page, even when the contact area-sensor 1 scans the document sheet 4 by holding the sheet therebetween.

Further, the hinge member 40 of the present embodiment includes the spring 45, which can make the gap between the image scanners 10 even wider. By having such a hinge member, the image scanners 10 can stably hold the document 4, even when the document 4 is reasonably thick.

The contact area-sensor 1 having the foregoing configuration includes the image scanning sensor substrate 20 in which the thin film transistors (TFT) are aligned in a matrix manner on a transparent substrate of such as a glass or a quartz. In this constitution, light emitted toward the rear side of the image scanning sensor substrate 20 passes through inside of the sensor, and then is reflected on the document surface, so as to provide image information to the sensor section 24. Therefore, the contact area-sensor 1 can obtain image information without using an optical system, thus realizing a small, thin, and light-weighted contact area-sensor 1.

Further, the sensor sections 24 aligned in a matrix manner perform color display by sequentially scanning the light source in which the R, G and B are switched by time. Provision of such sensor sections 24 allows the contact area-sensor 1 to perform high-speed scanning and also to omit a scanning mechanism.

Further, by opening the image scanners 10 via the hinge member 40, and respectively bringing both side of the document sheet 4, or plural pages of the document 4 into each scanning surface of the image scanner 10, it is possible to carry out image scanning with respect to large area of plural documents, with one operation. Further, the contact area-sensor 1 can be folded when carried, thus ensuring superior portability. Consequently, the present embodiment provides the contact area-sensor 1, which is capable of carrying out scanning with respect to a plurality of documents 4, and to plural different positions of the thick book 5, with one operation, while ensuring superior portability.

Further, by combining the image information scanned by plural operations, it is possible to carry out scanning for a larger area of image information of the document 4.

According to the scanning time by one image scanner 10, which is approximately 0.3 seconds for a monochrome image, and approximately 1 second for a color image, the scanning with two image scanners 10 takes approximately 2 seconds. Further, upon scanning of both sides of the document 4, the respective backlights 30 should be alternately lit so as to prevent information of the front and rear surfaces of the document from overlaying with each due to the transmitted light. The separate scannings for the front and rear surfaces of the document can be completed in approximately 2 seconds.

As described, the contact area-sensor 1 according to the present embodiment is constituted of a plurality of image scanners 10 for scanning an image, each of which includes an image scanning sensor substrate 20 including plural sensor sections 24 aligned in a matrix manner, and an elastic connecting line 2 for connecting the plurality of image scanners 10 to each other.

With this configuration, it is possible to create a small, thin, and light weighted contact area-sensor 1, which is capable of obtaining image information without using an optical system, which is required in a conventional CCD image sensor.

Further, the contact area-sensor 1 according to the present embodiment includes the separated image scanners 10, which are however connected to each other by the connecting line 2. This allows the contact area-sensor 1 to scan a document having a large area with one operation, by bringing the respective image scanners 10 into contact with the target document.

Further, when image scanning is not performed, the respective image scanners 10 can easily be overlaid with each other via the flexible connecting line 2.

Further, the flexible connecting line 2 allows the image scanners 10 to freely change the composition, so that the contact area-sensor 1 is capable of two sided scanning for a thick book or the like.

Accordingly, the contact area-sensor 1 is small, thin, light-weighted, and capable of obtaining a wide area of an image, while ensuring superior portability.

Further, the contact area-sensor 1 according to the present embodiment includes the image scanners 10, which are rotatably connected to each other by the hinge member 40. With this configuration, it is possible to scan a large area of one side of the document with one operation, by opening the image scanners 10 at 180° via the hinge member 40. Further, after the scanning is completed, the plural image scanners 10 can be overlaid with each other via the hinge member 40; thus, the contact area-sensor 1 can be easily folded.

The contact area-sensor 1 can perform scanning of a large area of information with one operation, and also can be carried in a folded state, while maintaining the connection state of the image scanners 10.

Consequently, it is possible to provide a small, thin, light-weighted contact area-sensor 1, which is capable of obtaining a wide area of an image, while ensuring superior portability.

Further, the hinge member 40 of the contact area-sensor 1 according to the present embodiment can be freely attached or removed to/from the image scanners 10. This allows the image scanners 10 to be separated from each other when carrying out scanning of image information from two documents distant from each other.

Further, in the contact area-sensor 1 of the present embodiment, the image scanners 10 can be opened at an angle of 90° via the hinge member 40.

Accordingly, the contact area-sensor 1 can carry out image scanning even for a thick book without a scanning error in such a manner that the book is opened and fixed at 90° so that the respective pages are completely flattened, and the contact area-sensor 1 is then brought into fully contact with the whole plane of the target image.

Further, the contact area-sensor 1 of the present embodiment can easily scan a document in the form of a sheet, by opening the respective image scanners 10 at 180° and fixing them at the angle by the hinge member 40 so that the image scanners 10 becomes a unified plane.

Further, in the contact area-sensor 1 according to the present embodiment, the hinge member 40 is made up of protrusion axes 41, each of which is protruded from one end of a lateral face of one of the image scanners 10; a rectangle plate 44 hung on the protrusion axes 41, including a long hole 42 created in a linear shape in a hanging direction for allowing the protrusion axes 41 to pass through, and a notch 43 created perpendicular to the hanging direction; and a spring 45 made of an elastic body, which pulls one of the protrusion axis 41 toward the other protrusion axis 41.

Accordingly, this hinge member 40 allows the contact area-sensor 1 to scan both sides of a document 4 by holding the document 4 between the two image scanners 10, for example. In this case, the document 4 held by the image scanners 10 is also pressed by the spring 45, thus ensuring contact of the document 4 with the image scanners 10. This means also that the hinge member 40 ensures contact between the two image scanners 10 when the contact area-sensor 1 is folded, and therefore, it is possible to hold the image scanners 10 without being separated from each other when the contact area-sensor 1 is carried.

Further, in the present embodiment, the two image scanners 10 are fixed at an opened angle of 90° or 180°, for example, by arranging the long hole 42 and the spring 45 of the hinge member 40.

Further, the contact area-sensor 1 according to the present embodiment can carry out image scanning by individually driving each image scanner 10. This function allows the image scanners 10 to carry out image scanning for only one side of the document 4, when image scanning is performed by holding the document 4 therebetween.

Further, the contact area-sensor 1 according to the present embodiment can sequentially drive the respective image scanner 10, so as to prevent the image scanners 10 from simultaneously scanning both sides of the document. In this manner, it is possible to unfailingly scan each side of the document without a scanning error.

Further, the contact area-sensor 1 according to the present embodiment is arranged so that each of the image scanners 10 includes a backlight 30 on a rear surface of the image scanning sensor substrate 20, and the backlight 30 sequentially turns on red light, green light and blue light in a sub-frame period. This allows the contact area-sensor to carry out color scanning of a document image.

Further, the contact area-sensor 1 according to the present embodiment stores all of the image information scanned by the respective image scanners 10 in a memory chip 6 provided at least one of the image scanners 10. This memory chip 6 is removable form the image scanner 10. Accordingly, the contact area-sensor 1 is not required to be connected with a PC etc. at all times, thus ensuring desirable portability. Further, the superior mobility allows the contact area-sensor 1 to carry out image scanning at an arbitrary place without a personal computer.

Note that, the present technology is not limited to the foregoing embodiment, but may be applied in many variations. For example, the hinge member 40 is not limited to the particular configuration adopted in the foregoing embodiment.

For example, as shown in FIG. 14(a), a commercially-available hinge 50 may be used as the hinge member 40. This hinge member 50 offers easy fabrication of the image scanners 10 rotatably connected to each other, as shown in FIGS. 14(b) and 14(c). Further, as shown in FIG. 14(d), this hinge 50 can be separated into two parts, thus allowing the image scanners 10 to easily scan two documents distant from each other.

Further, though the connecting line 2 of the present embodiment is externally exposed, as shown in FIG. 6, the present technology is not limited to this structure, and the connecting line 2 may be internally provided in the hinge member 40, as shown in FIG. 15(a) through FIG. 15(c). More specifically, the example shown in FIGS. 15(a) through 15(c) constitutes the protrusion axes 41 and the rectangle plate 44 by using the cylinder protrusion axes 41a and a cylinder connecting tubule 44a. In this case, the cylinder connecting tubule 44a can be divided into two parts, which are partially overlapped with each other. With this structure, the image scanners 10 are capable of freely scanning with respect to both the document sheet 4 and the thick book 5, by expanding/contracting the cylinder connecting tubule 44a.

By adopting this structure, the connecting line 2 is not externally exposed when the contact area-sensor 1 is opened, or closed, as shown in FIGS. 16(a) and 16(b). This offers better appearance of the contact area-sensor 1.

Further, though the image scanner 10 of the present embodiment includes the backlight 30, the present technology is not limited to this structure, and the image scanner 10 may be made up only of an image scanning sensor substrate 20. In this case, the image scanner 10 scans an image by using outside light.

Further, when the image scanner 10 does not include the backlight 30, it is preferable that a translucent/lightproof switching layer is provided on the rear surface of the image scanning sensor substrate 20.

Figure 17:
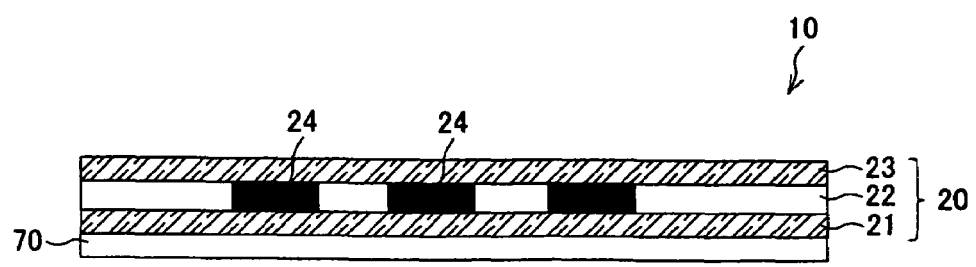
FIG. 17 is a cross-sectional view showing a different type of the foregoing contact area-sensor, which includes a translucent/lightproof switching layer, instead of the backlight.

More specifically, as shown in FIG. 17, the image scanner 10 may be constituted of the image scanning sensor substrate 20 and a translucent/lightproof switching layer 70 provided on the rear surface of the image scanning sensor substrate 20.

The translucent/lightproof switching layer 70 operates to switch condition of the image scanning sensor substrate 20 between a translucent state and lightproof state. The translucent/lightproof switching layer 70 has a function of the translucent/lightproof switching means.

For example, the translucent/lightproof switching layer 70 is created by, as with a liquid crystal display, evaporating a transparent electrode on two glass substrates, and sealing a liquid crystal material between the glass substrates, and then laminating polarization films on both sides of the glass substrates. This translucent/lightproof switching layer 70 is electrically turned on or off so as to be switched between the translucent state and the lightproof state.

When the contact area-sensor 1 having such an arrangement carries out image scanning by holding a document sheet 4 between the image scanners 10, it may be arranged so that one of the image scanners 10 is set in the lightproof state while the other scans image information.

Therefore, when two image scanners 10 alternately carry out scanning of both sides of a document 4, it is possible to prevent the image scanner 10 placed on one side of the document 4 from scanning information of both the front and rear surfaces of the document 4 due to the transmitted light coming from the rear surface of the document.

Further, when the contact area-sensor 1 carries out general scanning, i.e., scanning of one side of the document 4, the image scanners 10 are placed on the document 4, and the translucent/lightproof switching layer 70 is set in the translucent state.

Thus, the contact area-sensor 1 can scan image information of the document 4 by using outside light coming from the rear side of the image scanners 10.

Second Embodiment

Figure 18:
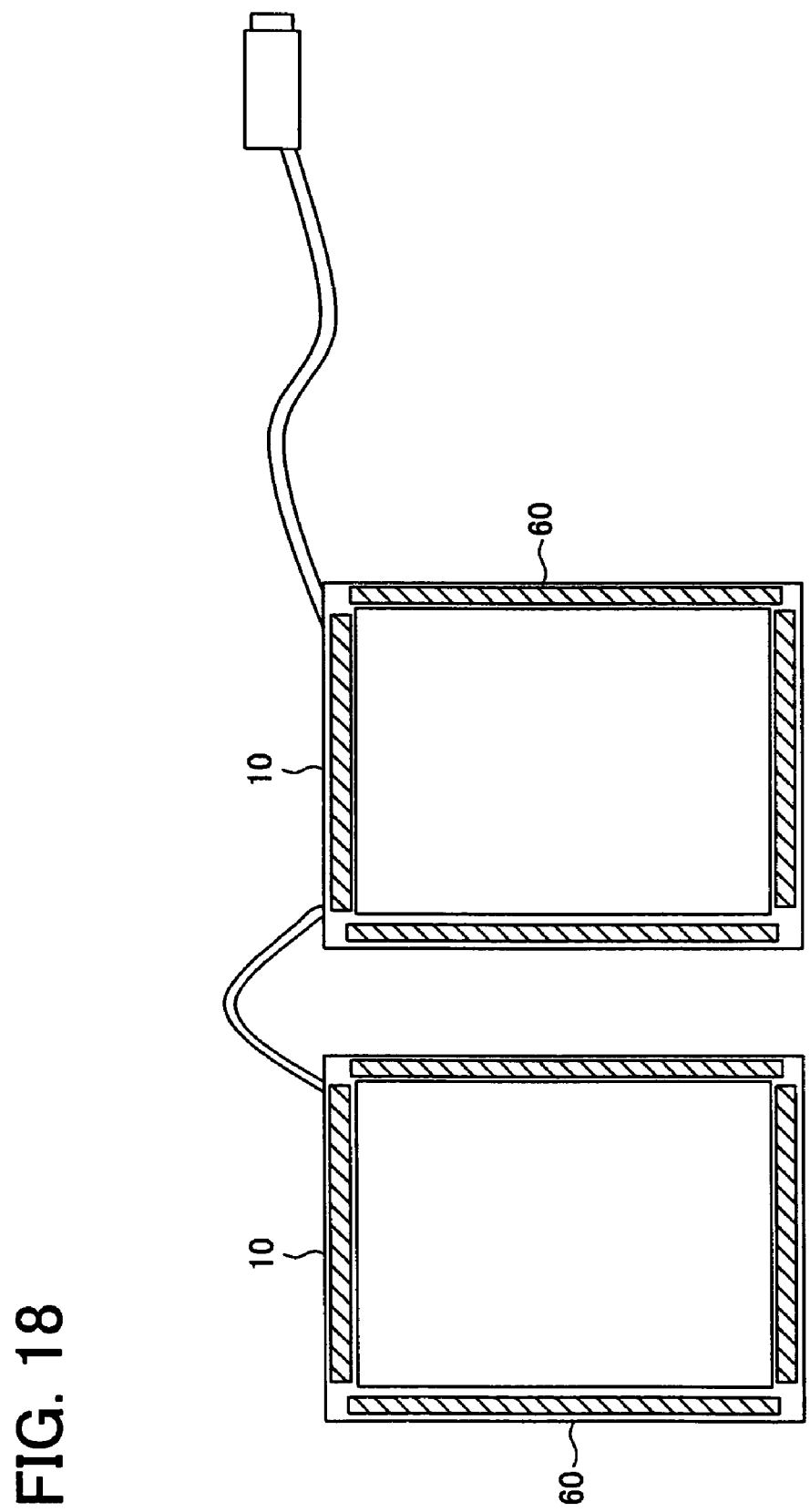
FIG. 18 is a plan view showing a contact area-sensor, which is provided with magnets.

The following will explain another embodiment with reference to FIG. 18. For ease of explanation, materials having the equivalent functions as those shown in the drawings pertaining to Embodiment 1 above will be given the same reference symbols, and explanation thereof will be omitted here.

In the present embodiment, as shown in FIG. 18, magnets 60 are provided on the periphery of the respective image scanners 10 instead of the hinge member 40 of the First Embodiment. The magnets 60 allow the plural image scanners 10 to be detachable from each other.

Note that, the present embodiment provides magnets 60 on the periphery of the respective image scanners 10, instead of the hinge member 40; however, the present technology also allows a structure including both the hinge member 40 and the magnets 60.

This structure ensures the contact between the image scanners 10 due to magnetic force, when the contact area-sensor 1 is folded.

Further, the image scanners 10 fixedly connected to each other are however can easily be separated from each other, thus carrying out image scanning in the opened state.

Therefore, it is possible to provide a contact area-sensor 1 capable of obtaining wide area image information, with superior portability.

Note that, the present technology is not limited to the described embodiments and rather may be applied in many variations which however do not exceed the scope of the patent claims set forth below.

For example, the backlight 30, which is made of a light-emitting diode 32 in the First and Second Embodiments, may also be made of an EL (Electro Luminescence).

As described, the contact area-sensor is arranged so that the image scanners are rotatably connected to each other by a hinge member.

It is possible to scan a large area of one side of the document with one operation, by opening the image scanners via the hinge member, which rotatably connects the image scanners. Further, after the scanning is completed, the plural image scanners can be overlaid with each other via the hinge member; thus, the contact area-sensor can be easily folded.

Accordingly, the contact area-sensor can perform scanning of a large area of information with one operation, and also can be carried in a folded state, while maintaining the connection state of the image scanners.

Consequently, it is possible to provide a small, thin, light-weighted contact area-sensor, which is capable of obtaining a wide area of an image, while ensuring superior portability.

Further, the contact area-sensor is arranged so that the hinge member is detachable from each of the image scanners.

The hinge member can be freely attached or removed to/from the image scanners. This allows the image scanners to be separated from each other when carrying out scanning of image information from two documents distant from each other.

Further, the contact area-sensor is arranged so that the hinge member connecting the image scanners to each other allows the image scanners to be fixed at an opened angle of 90°.

For example, when scanning is carried out with respect to both sides of an opened thick book, it is difficult to completely flatten the book, since inner ends of the book are curved toward the binding areas. In this case, if the book is opened at an angle of 90°, the respective pages can easily be flattened.

In this view, the contact area-sensor is arranged so that the hinge member connecting the image scanners to each other allows the image scanners to be fixed at an opened angle of 90°.

Accordingly, the contact area-sensor can carry out image scanning even for a thick book without a scanning error in such a manner that the book is opened and fixed at 90° so that the respective pages are completely flattened, and the contact area-sensor is then brought into fully contact with the whole plane of the target image.

Further, the contact area-sensor is arranged so that the hinge member connecting the image scanners to each other allows the image scanners to be fixed at an opened angle of 180°.

For example, when carrying out scanning of a document having the same size as the two image scanners adjacently disposed, it is preferable that the image scanners are fixed to be a unified plane.

The hinge member connecting the image scanners to each other allows the image scanners to be fixed at an opened angle of 180°, and therefore the image scanners are stably fixed as a unified plane, and can easily scan a document in the form of a sheet.

Further, the contact area-sensor is arranged so that protrusion axes, each of which is protruded from one end of a lateral face of one of the image scanners; a rectangle plate hung on the protrusion axes, including a long hole created in a linear shape in a hanging direction for allowing the protrusion axes to pass through, and a notch created perpendicular to the hanging direction; and a spring made of an elastic body, which pulls one of the protrusion axis toward the other protrusion axis.

The rectangle plate is provided with a long hole for allowing the protrusion axes to pass through, and the protrusion axes are pulled toward each other by the elastic body. Accordingly, the image scanners are also pulled toward each other. Therefore, this hinge member allows the contact area-sensor to scan both sides of a document by holding the document between the two image scanners, for example. In this case, the document held by the image scanners is also pressed by the spring, thus ensuring contact of the document with the image scanners. This means also that the hinge member ensures contact between the two image scanners when the contact area-sensor is folded, and therefore, it is possible to hold the image scanners without being separated from each other when the contact area-sensor is carried.

Further, in the present embodiment, the two image scanners are fixed at an opened angle of 90° or 180°, for example, by arranging the long hole and the spring of the hinge member.

Further, the contact area-sensor is arranged so that the image scanners include a magnet between the image scanners, which fixes the image scanners when the image scanners are overlaid with each other and which allows the image scanners to be freely joined together or removed from each other.

The contact between the image scanners is ensured due to magnetic force when the contact area-sensor is folded. Further, the image scanners fixedly connected to each other are however can easily be separated from each other, thus carrying out image scanning in the opened state.

Consequently, it is possible to provide a contact area-sensor capable of obtaining a wide area of an image, while ensuring superior portability.

Further, the contact area-sensor is arranged so that the connecting line is internally included in the hinge member.

The connecting line is internally included in the hinge member, i.e., it is not externally exposed. This offers better appearance of the contact area-sensor.

Further, the contact area-sensor is arranged so that the image scanners can be individually driven for scanning images.

The contact area-sensor can carry out image scanning by individually driving each image scanner. This function allows the image scanners to carry out image scanning for only one side of the document, when image scanning is performed by holding the document therebetween.

Further, the contact area-sensor is arranged so that the image scanners can be sequentially driven for scanning images.

As described above, the image scanner generally includes a backlight. Therefore, when the two image scanners simultaneously scan the front and rear surfaces of the document by holding the document therebetween, an image scanner placed on one side of the document scans the image information of both the front and rear surfaces of the document, due to irradiation of the backlight.

In view of this problem, the contact area-sensor according to the present embodiment can sequentially drive the respective image scanner, so as to prevent the image scanners from simultaneously scanning both sides of the document. In this manner, it is possible to unfailingly scan each side of the document without a scanning error.

Further, the contact area-sensor is arranged so that each of the image scanners includes a backlight on a rear surface of the image scanning sensor substrate, the backlight sequentially turning on red light, green light and blue light in a sub-frame period.

Each of the image scanners includes a backlight on a rear surface of the image scanning sensor substrate, and the backlight sequentially turns on red light, green light and blue light in a sub-frame period. This allows the contact area-sensor to carry out color scanning of a document image.

Further, the contact area-sensor is arranged so that at least one of the image scanners includes detachable storing means, which stores all image information scanned by the image scanners.

All of the image information scanned by the respective image scanners is stored in the storing means provided at least one of the image scanners; and this storing means is removable form the image scanner. Accordingly, the contact area-sensor is not required to be connected with a PC etc. at all times, thus ensuring desirable portability. Further, the superior mobility allows the contact area-sensor to carry out image scanning at an arbitrary place without a personal computer. Note that, by removing the storing means from the contact area-sensor, and attaching it to a personal computer, the document image information stored in the storing means can easily be displayed in the personal computer.

Further, the contact area-sensor is arranged so that each of the image scanners is provided with translucent/lightproof switching means on the rear surface of the image scanning sensor substrate, for carrying out switching between a transparent state and a lightproof state.

When the contact area-sensor carries out image scanning by holding a document sheet between the image scanners, it may be arranged so that one of the image scanners is set in the lightproof state while the other scans image information.

Therefore, it is possible to prevent the image scanner placed on one side of the document from scanning information of both the front and rear surfaces of the document due to the transmitted light coming from the rear surface of the document.

The embodiments and concrete examples of implementation discussed in the foregoing detailed explanation serve solely to illustrate the technical details, which should not be narrowly interpreted within the limits of such embodiments and concrete examples, but rather may be applied in many variations within the spirit of this disclosure, provided such variations do not exceed the scope of the patent claims set forth below.

What is claimed is:

1. A contact area-sensor, comprising:
   a plurality of image scanners, each of which includes an image scanning sensor substrate in which a plurality of sensor sections are aligned in a matrix manner so as to scan an image;
   a connecting line having flexibility, for connecting the plurality of image scanners to each other; and
   a hinge member that rotatably couples the image scanners to one another, wherein the plurality of image scanners can carry out simultaneous scanning of images without changing their positions.

2. The contact area-sensor as set forth in claim 1, wherein the hinge member is detachable from each of the image scanners.

3. The contact area-sensor as set forth in claim 1, wherein the hinge member connecting the image scanners to each other allows the image scanners to be fixed at an opened angle of 90°.

4. The contact area-sensor as set forth in claim 1, wherein the hinge member connecting the image scanners to each other allows the image scanners to be fixed at an opened angle of 180°.

5. The contact area-sensor as set forth in claim 3, wherein the hinge member comprises:
   a protrusion axis which is protruded from one end of a lateral face of each of the image scanners;
   a generally rectangular plate including an elongated hole that extends in a length direction of the plate from a first end of the plate and a separate aperture formed on a second end of the plate, wherein the protrusion axis of one of the image scanners extends trough the elongated hole, and wherein the protrusion axis of another of the image scanners extends through the aperture; and
   a biasing member that biases one protrusion axis toward the other protrusion axis.

6. The contact area-sensor as set forth in claim 4, wherein the hinge member comprises:
   a protrusion axis, which is protruded from one end of a lateral face of each of the image scanners;
   a generally rectangular plate including an elongated hole that extends in a length direction of the plate from a first end of the plate and a separate aperture formed on a second end of the plate, wherein the protrusion axis of one of the image scanners extends through the elongated hole, and wherein the protrusion axis of another of the image scanners extends through the aperture; and
   a biasing member that biases one protrusion axis toward the other protrusion axis.

7. The contact area-sensor as set forth in claim 1, wherein at least one of the image scanners includes at least one magnet, and wherein the at least one magnet removably holds the image scanners together when the image scanners are overlaid with each other.

8. The contact area-sensor as set forth in claim 1, wherein the connecting line is internally included in the hinge member.

9. The contact area-sensor as set forth in claim 1, wherein the image scanners can be individually driven for scanning images.

10. The contact area-sensor as set forth in claim 1, wherein the image scanners can be sequentially driven for scanning images.

11. The contact area-sensor as set forth in claim 1, wherein each of the image scanners includes a backlight on a rear surface of the image scanning sensor substrate, the backlight sequentially turning on red light, green light and blue light in a sub-frame period.

12. The contact area-sensor as set forth in claim 1, wherein at least one of the image scanners includes detachable storing means for storing image information scanned by the image scanners.

13. The contact area-sensor as set forth in claim 1, wherein each of the image scanners is provided with translucent/lightproof switching means on the rear surface of the image scanning sensor substrate, for carrying out switching between a transparent state and a lightproof state.

14. The contact area-sensor of claim 5, wherein a first end of the biasing member is attached to one protrusion axis, and wherein a second end of the biasing member is attached to the other protrusion axis.

15. The contact area-sensor of claim 5, wherein a first end of the biasing member is attached to a one protrusion axis, and wherein a second end of the biasing member is attached to the plate.

16. The contact area-sensor of claim 1, wherein each of the image scanners has a scanning face, and wherein the hinge member allows the scanning faces of the image scanners to be positioned parallel to one another at varying distances from one another.

17. The contact area-sensor of claim 1, wherein each of the image scanners has a scanning face, and wherein the hinge member allows the scanning faces of the image scanners to be positioned at an angle with respect to one another, the angle ranging between 0-180°.

18. The contact area-sensor of claim 1, wherein each image scanner can capture an image of a document that is brought adjacent the image scanner without the need for any relative movement between the document and any portion of the image scanner.

19. The contact area-sensor of claim 1, wherein the plurality of image scanners comprises first and second image scanners and further comprising an output line that is coupled to the first image scanner, wherein image data generated by the second image scanner is forwarded from the second image scanner to the first image scanner via the connecting line, and wherein the image data from both the first and second image scanners is then output from the contact area-sensor through the output line.

* * * * *

UNITED STATES PATENT AND TRADEMARK OFFICE
CERTIFICATE OF CORRECTION

PATENT NO. : 7,609,418 B2  Page 1 of 1
APPLICATION NO. : 10/668378
DATED : October 27, 2009
INVENTOR(S) : Masayuki Takahashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1798 days.

Signed and Sealed this

Twelfth Day of October, 2010

David J. Kappos
*Director of the United States Patent and Trademark Office*